Feb. 25, 1964     R. E. SEIDELL     3,122,192
TRACTION DEVICE

Filed July 11, 1963     3 Sheets-Sheet 1

INVENTOR.
RICHARD E. SEIDELL
BY
*Walter S. Pawl*

Feb. 25, 1964 R. E. SEIDELL 3,122,192
TRACTION DEVICE
Filed July 11, 1963 3 Sheets-Sheet 2

INVENTOR.
RICHARD E. SEIDELL
BY
*Walter S. Pawl*

Feb. 25, 1964   R. E. SEIDELL   3,122,192
TRACTION DEVICE

Filed July 11, 1963   3 Sheets-Sheet 3

INVENTOR.
RICHARD E. SEIDELL
BY
Walter S. Pawl

United States Patent Office 3,122,192
Patented Feb. 25, 1964

3,122,192
TRACTION DEVICE
Richard E. Seidell, 1736 Church St. NW.,
Washington 6, D.C.
Filed July 11, 1963, Ser. No. 294,291
11 Claims. (Cl. 152—225)

This invention relates generally to a traction device for installation on powered wheels and more particularly to a device and its variations for installation on a conventional wheel with resilient tire.

The principal object of this invention is to provide a traction increasing device which can be simply constructed and easily attached to a vehicle wheel by one person. The device permits quick and easy attachment without access to inside of wheel, without crawling under the vehicle, without getting one's hands or clothing dirty, without jacking up the vehicle, without removing hub caps, without assistance, without the application of great force, without previous experience, without special tools (all contrary to existing traction increasing devices); even when the vehicle is already mired down or stuck in the snow or mud. The device is easily and quickly enough installed to obviate the need for snow tires which are kept on cars in the winter primarily because conventional tire chains, which are better traction devices, are too much trouble to install and remove. In most localities it is desirable to use traction increasing devices only for short distances, until the vehicle is on a main highway which is cleared of snow.

It is a further purpose of this device to be attachable to a large range of tire sizes, varying in diameter and width. The device will fit a tire when it is new as well as when it is nearly worn out and of a smaller diameter.

It is still a further object of this invention to provide a device fulfilling the above objects while being of simple construction, and being simply and inexpensively manufactured.

In the drawings FIG. 1 is a front elevation of the traction device as it would be applied to a vehicle tire. The tire is shown in outline. Also apparent are the adjusting and clamping nut, the three studs for additional cross bar attachments, the adjusting slot, the guide, and the tire compression caused by the three cross bars.

Figure 11:
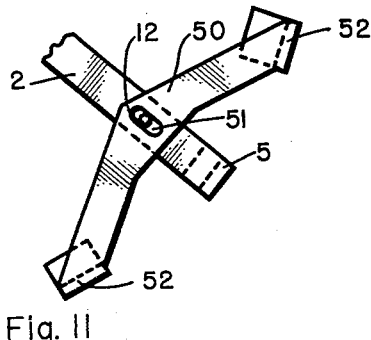
FIG. 11 is an attachment to provide additional cross bars, shown attached to a cross bar. Also shown are the attaching stud and the adjustment slot.
Figure 12:
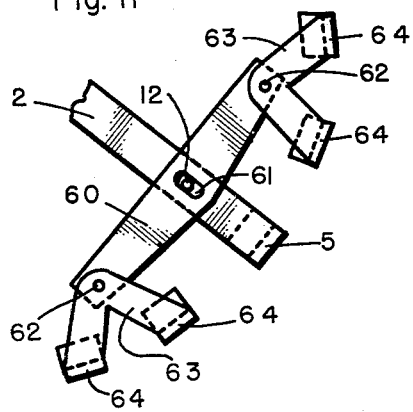

FIG. 12 is an alternative form of the attachment of FIG. 11, providing more cross bars. For a three armed device such as that of FIG. 1 and FIG. 2, this attachment would provide a total of 15 cross bars. Also shown are the attaching stud, the adjustment slot, and the two pivots on the attachment which permit it to fit a range of tire diameters.

Figure 1:
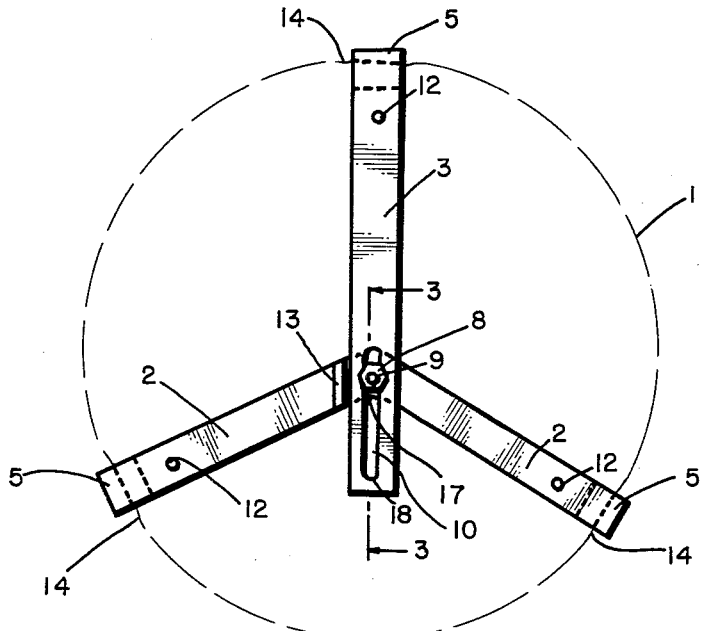
Figure 2:
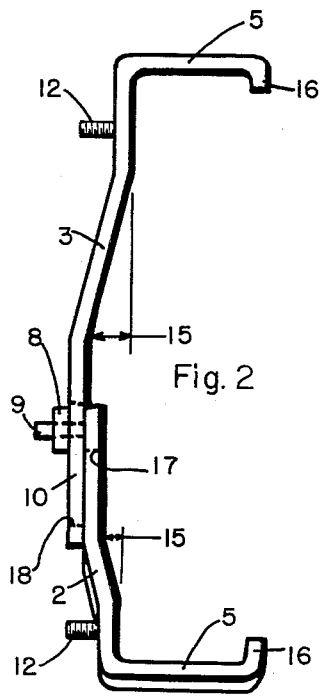
FIG. 2 is a side elevation of the device shown in FIG. 1.
Figure 3:
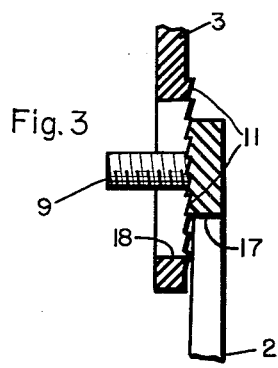
FIG. 3 is an enlarged cross-section view taken on line 3—3 of FIG. 1 showing the adjusting, tightening, and fastening means.
Figure 4:
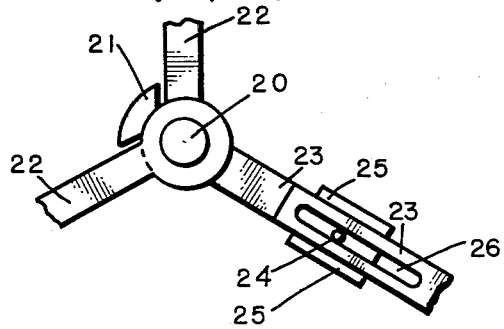
FIG. 4 shows the center portion of an alternative form which has three pivoted arms with one of them of adjustable length. Also shown are the stop which prevents two of the arms from closing toward each other, and the guides for the adjustable arm.
Figure 5:
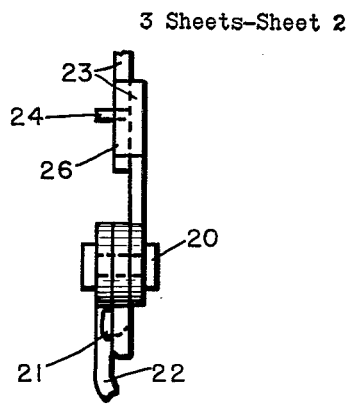
FIG. 5 is a bottom view of FIG. 4.
Figure 6:
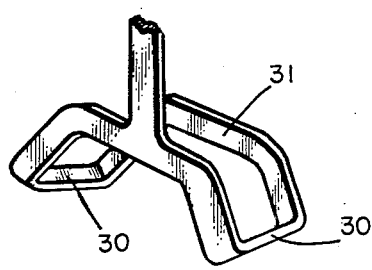
FIG. 6 is an alternative form for the cross bars at the end of the radial arms of the traction device, providing twice as many cross bars.
Figure 13:
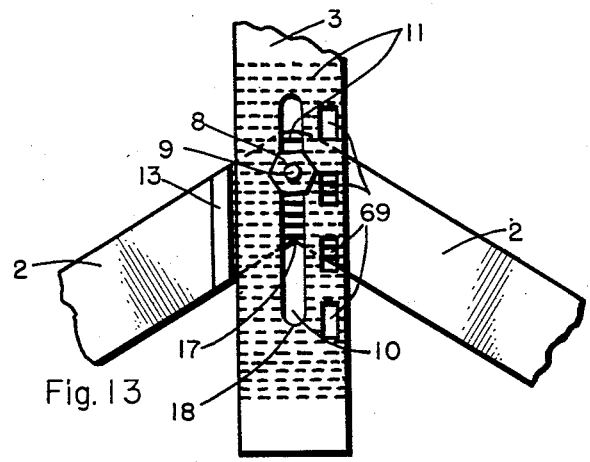

FIG. 13 is an enlargement of the center of the traction device shown in FIG. 1, showing the clamping and tightening means, the guide, the positioning seriations, and a series of holes to assist in tightening.

Figure 14:
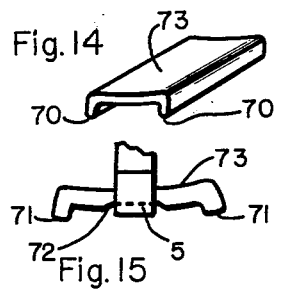

FIG. 14 is an attachment which provides additional cross bars but which is attached by different means than in FIG. 11, by the force between the tire and the cross bar.

Figure 15:
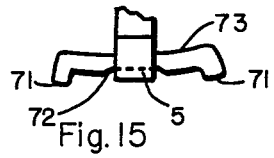

FIG. 15 is an alternative form of FIG. 14 which possesses a formed portion for better retaining the attachment. It is shown in position held by a cross bar. In an extreme application of these attachments with the attachment of FIG. 12 on a traction device having three arms, there would be a total of 30 cross bars.

Figure 16:
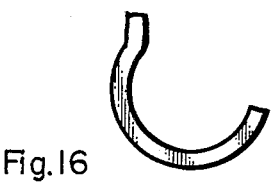
Figure 17:
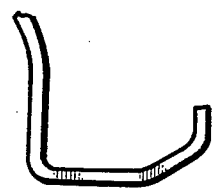
Figure 18:
Figure 19:
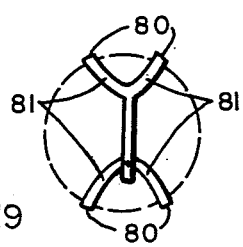
Figure 20:

FIG. 16 is an alternative form of cross bar.
FIG. 17 is an alternative form of cross bar.
FIG. 18 is an alternative form of cross bar.
FIG. 19 is an alternative form of the traction device which has four cross bars.
FIG. 20 shows nine alternative forms for the cross section of the cross bars.

The most common traction increasing device is the tire chain, composed of cross bars of chain held in place by means of two circumferential side chains, one on the inside and one on the outside of the wheel. Such devices are inherently loose fitting and in practice are usually tightened by applying central radial force to the outer circumferential chain at several points by some elastic attachment, commonly called chain tighteners.

Tire chains may be installed in several ways: jacking up the vehicle, removing the wheel, driving on to the chains, by the use of attaching clips, or a combination of these. All such attaching methods require access to both sides of the wheel, considerable dexterity, and a measure of strength, if not previous experience. At best it is a dirty, inconvenient, and slow job which frequently must be performed in snowy and cold weather.

Referring more particularly to the figures, 1 represents the outline of a tired automobile wheel on which the traction device is shown installed. The tire 1 is shown indented 14 by the pressure of the cross bars 5 exerted by the radial arms 2 and 3 mutually clamped by the tightening nut 8 screwed onto the stud 9 within the adjusting slot 10.

The stud 9 and nut 8 clamp the serrations 11 of the single arm unit 3 and the double arm unit 2 against each other, thus retaining the traction device tightly affixed to the tire. Also shown on each arm 2 and 3 is the stud 12 by which the attachments are affixed and adjusted. The guide bar 13 prevents accidental cross clamping of the serrations.

An offset 15 in the radial arms 2 and 3 allows the device to be installed over protruding as well as shallow hub caps.

The main pivot 20 of an alternative form of the traction device is shown with its stop 21 which prevents the two short arms 22 from swinging together under accumulated displacements due to repeated rotation of the tire. The pivot 20 is mounted off center of the wheel by the arm 23 being longer than the other arms 22 even when the device is at its smallest adjustment. Also shown are the tightening stud 24, guide bars 25, and the adjusting slot 26.

The double form of cross bar has two cross bars 30 braced on the inside of the tire by a joining member 31.

Studs 32 for attaching various forms of additional cross bars are affixed to the double form of cross bar. Also shown is a chain link 33 type and a formed rod 34 type of additional cross bar.

Figure 8:
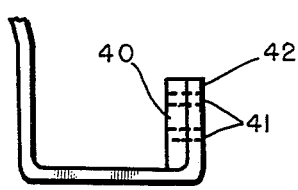
FIG. 8 is the cross bar portion of a radial arm showing an attached spacer.

A typical cross bar shown in FIG. 8 has indicated a means of fitting a spacer 40 to adapt the traction device to several widths of tire. A means for attaching the spacer 40 is indicated by 41 which might represent threaded holes and screws, or which might as well represent two pins affixed to the spacer and positioned in holes in the cross bar projection 42. Note that the cross bar projections 42 are shown relatively longer than the cross bar projections 16. The traction device shall have any convenient length of cross bar projections 16 and 42 which will adequately hold the device to the tire without damaging the tire or the wheel and without being difficult of installation.

Figure 9:
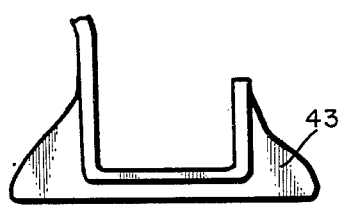
FIG. 9 is an alternative form of cross bar of the tractor lug style.
Figure 10:
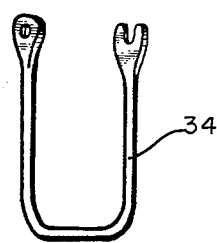
FIG. 10 is an alternative form of additional cross bar for attachment to the main cross bar of the style of FIG. 7.

In FIG. 9, 43 is an attachment for increasing cross bar traction and obviously many other forms are suitable, a rectangular cross section form, for example. The attaching means is not shown and might be any standard means, nut and bolt perhaps. FIG. 10 also represents the appearance of an alternative form of cross bar.

Attachment 50 serves to increase the number of cross bars and is attached by means of the attachment stud 12 positioned in the adjusting slot 51. The adjusting slot 51 permits desired contact between all the cross bars 5 and 52 and the tire for a range of tire diameters. The cross bar 5 plus the additional cross bars 52 will thus provide a total of 9 cross bars spaced around the tire, for the basic traction device which is possessed of three radial arms 2 and 3.

Attachment 60 likewise serves to increase the number of cross bars and is attached by means of the attaching stud 12 positioned in the adjusting slot 61. The adjusting slot 61 along with the pivots 62 of swinging arms 63 permit the desired contact between all the cross bars 5 and 64 and the tire for a range of tire diameters. The cross bar 5 plus the additional cross bars 64 will thus provide a total of 15 cross bars spaced around the tire, for the basic traction device which is possessed of three radial arms 2 and 3.

FIG. 13 provides a close-up view of the center section of the basic traction device of FIG. 1. The stud 9 in the slot 10 permits the nut 8 to be tightened, clamping the serrations 11 together while the radial arms 2 and 3 are held in the tightened position, as described elsewhere in this disclosure, as desired. The guide bar 13 maintains alignment of the serrations 11 of the arm 3 with those of arms 2. Leverage holes 69 are provided to assist in tightening the traction device on the tire should their use be desired. Notches might be used for this purpose rather than the holes 69 and a special tool or a screw driver might be used whether holes or notches are or are not provided. However, as described elsewhere, no tool at all is required.

The attachment of FIG. 14 is held in position on the periphery of the wheel by being installed between the tire and a cross bar 5, 30, 62, 64 before the traction device is tightened on the wheel. The protruding portions 70 provide additional cross bars. If this attachment were used on the cross bars of FIG. 12, the basic traction device would have a total of 30 cross bars spaced around the tire.

The attachment of FIG. 15 is like that of FIG. 14 except that it has a groove 72 to better tighten it to the tire. The surface 73 which presses against the tire may be embossed to increase the resistance to sliding. This attachment and that of FIG. 14 may be possessed of a right angle extension to serve as a spacer, as in FIG. 8, to fit the traction device to various widths of tires.

Alternative forms of cross bars are shown in FIGURES 16, 17, and 18 to illustrate that the intent of the invention is to include a great variety of cross bar configurations. FIG. 16 is a better fit on the tire. FIGURES 17 and 18 will fit a variety of tire widths without resorting to a spacer block 40. FIG. 17 provides a partially flat contact with the road surface while FIGURES 16 and 18 do not.

FIG. 19 outlines an alternative form of the traction device which possesses four cross bars 80 and four radial arms 81 which is adjustable to fit a variety of tire diameters.

FIG. 20 illustrates nine of the multitude of possible cross bar cross sections.

This traction device is comprised of a few simple parts in simple assembly and is thus cheap and easy to manufacture as well as simple to use. When this device has been attached to a tire, in contrast to other traction devices, the tension which retains it on the tire is provided by and solely by the tire through its inherent resiliency.

Two or more of these traction devices with different amounts of offset 15 in their radial arms 2 and 3 can be applied to the same tire thus providing another way of increasing the number of cross bars.

The clamping nut 8 and stud 9 do not adjust the traction device. They merely clamp the serrations 11 of the single radial arm 3 against the serrations 11 of the double radial arm 2 to maintain the device in the tightened configuration when the tightening force is removed. The device may be put into this tightened configuration by any of several methods all of which allow variation in the amount of tightening.

The device may be positioned upon the tire and then a rod-like device, perhaps a tool, perhaps a screw driver, used in a lever-like action between the serrations 11 of the double arm 2 and the holes 69 of the single arm 3 can effect the tightening to the degree desired.

The device may be positioned and tightened as above by the use of a special tool acting between the serrations 11 of the double arm 2 and the holes 69 of the single arm 3, or acting between the lower part 17 of the serrated portion of the double arm 2 and the end 18 of the adjusting slot 10.

The device may be positioned and loosely tightened before rolling the vehicle, thus rotating the tire until it rests upon the cross bars of one of the radial arms 2 and 3, preferably the single arm 3; then the device may be clamped with nut 8, the vehicle's weight providing the tightening force.

The device may be positioned and clamped while the tire is deflated or partially deflated. Reinflation will then provide an additional tightening force.

Any or all of these tightening methods may be used in combination giving great control over the amount that the cross bars will protrude beyond the tire surface. Thus the user has good control over the amount of traction on bad roads as well as the amount of discomfort, noise, and wear on good roads.

The clamping nut 8 may be of various forms. Any form other than the hexagonal form shown shall be considered within the scope and intent of this patent. A very suitable clamping means might consist of two wing nuts, one for clamping and one for jamming the clamping nut. Such nuts may be of an exaggerated size to permit great tightening by hand.

Under extreme conditions the device may be quickly disassembled by removal of the clamping nut 8 for easier installation.

This traction device is even easier to remove than to install, and the installation is much easier than either the installation of or removal of conventional tire chains.

This traction device can be easily installed under low fenders, over hub caps, touches only the tire, and folds or disassembles for fairly compact storage. It folds in the sense that the single radial arm 3 can be pivoted on the clamping stud 9 to a position adjacent to one of the double radial arms 2.

Figure 7:
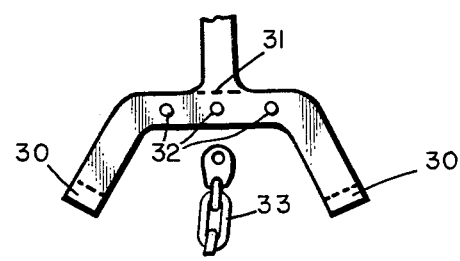
FIG. 7 is a front elevation of FIG. 6, also showing studs for mounting additional cross bars of various kinds. One such additional cross bar, in the form of a chain link, is also shown.

The cross bars can be made in various forms (FIGURES 16, 17, 18, 20) and can have attachments of various forms (FIGURES 7, 9, 10) including chains, bars, rods, and rubber or other tire-tread-like units. The device, its cross bars, and their attachments can be made of various materials—for example: steel, aluminum, alloys, plastic, fiberglass, reinforced plastic, nylon covered metal, etc.

The inner side of the cross bars may be curved and smoothed to reduce tire wear. In any event they will probably cause less wear and damage to tires and to roads than do chains.

The prior art such as disclosed in the Harrop Patent No. 2,426,683 has an over center toggle for tightening the cross bars to the tire. The toggle tightens a flat metal spring which supplies the force holding the cross bars to the tire. Such a toggle and spring tightening means permits a tight fit to only a small range of tire diameters and the degree of tightening depends on the size of tire as does the difficulty of swinging the toggle. No provision is made for adding cross bars. My device doesn't involve a toggle nor a spring, will fit a large range of tire diameters, the degree of tightening does not depend on tire diameter, the difficulty of tightening does not depend on tire diameter, and permits the addition of cross bars.

The Harrop patent is comprised of 5 parts, one of which is a formed spring member. My basic device is comprised of 4 parts, none of which are spring forms.

The prior art such as disclosed in the Boyer Patent No. 2,436,549 has four cross bars held against the tire periphery by over center toggles and adjustable springs arranged in a square center structure. In addition, the radial arms are adjustable by a threaded bolt. This device will not fit a large range of tire diameters, is complicated to manufacture, and does not provide for additional cross bars. It is retained on the tire by the force supplied by one or two coil springs. My device will fit a large range of tire diameters, is easy to manufacture, and does provide for installing additional cross bars.

The Boyer patent comprises four pivotal connections which will pivot with each tire rotation, one or two adjustable springs, four adjusting bolts, two sliding members, and four complex cross bars, a total of some 43 parts. My basic device does not have any pivotal connections, when clamped it is essentially one piece and the cross bars are simply bent extensions of the radial arms, it contains no springs, no toggles, no moving parts, with a total of 4 parts.

The prior art such as disclosed in the Jacobs Patent No. 2,586,049 has a rotatable central crank rotated by an operating lever to clamp the cross bars to the tire. This device will not fit a large range of tire diameters and is complicated to manufacture. It is retained in its tightened position by the frictional force between the cross bars and the tire. Should the cross bars slide on the periphery of the tire, the device would loosen. No provision is made for adding cross bars. My device will fit a large range of tire diameters, is easy to manufacture, will not loosen if the cross bars should slide on the periphery of the tire, and provides means for adding additional cross bars.

The Jacobs patent comprises six pivotal connections which must pivot for each rotation of the tire and the cross bars are somewhat complex structures. In my basic device there are no pivotal connections, when clamped it is essentially one piece, and the cross bars are simply bent extensions of the radial arms. Not including the chain cross bars, the Jacobs patent is comprised of some 39 or more parts, some of which are moving parts. My basic device is comprised of 4 parts, none of which are moving parts.

The prior art such as disclosed in the Ziegler Patent No. 2,691,999 has four cross bars attached to a nearly square pivoted array of eight arms, some of which are adjustable. The device is held on the tire by the tire's own resiliency, the device being pre-adjusted to proper diameter to attain the desired tightness when a key slot is dropped over a headed pin while compressing the device, thus it is required to compress the device more than desired in order to attain a tight fit when the pin drops into the small end of the key slot. During normal use in driving it is possible for the pin to drop out of the key slot. The device will not fit a large range of tire diameters and is complicated to manufacture. My device has a positive clamping means which does not require greater tightening than is desired, and the clamping does not depend on an arrangement which could snap loose in use. My device will fit a large range of tire diameters, is easy to manufacture, and does provide for installing additional cross bars.

The Ziegler patent is comprised of some 44 parts including seven pivoted joints all of which pivot for each tire rotation. My device is comprised of 4 parts, none of which are moving parts. When attached to a tire it is essentially one piece.

The prior art such as disclosed in the Minutilla Patent No. 2,912,036 has three pivoted arms with little radial adjustment, held in their use position by a shaped central piece and tightening screw. This device will fit only a very small range of tire diameters and is complicated to manufacture. No provision is made for adding cross bars. If it fits the tire tightly, it will be difficult to install. My device will fit a large range of tire diameters, is easy to manufacture, and provides a means for adding additional cross bars. My device will fit the tire tightly and is easy to install.

The Minutilla patent is comprised of six parts and in use is essentially one piece. My basic device is comprised of four parts and in use is essentially one piece.

It is intended that this invention shall include within its scope various other forms and fastening means for performing the described functions. For example, mathematical and practical considerations dictate three as the ideal number of cross bars for the basic device (FIG. 1), yet the invention is considered as including variations with other numbers of cross bars (FIG. 19 shows a version with four). With fewer than three cross bars the device will not, or is unlikely, to stay on the tire. With more than three cross bars the device will not be as easy to install, particularly under adverse conditions, and it becomes difficult to fit tires of different diameters. Even for the form with three radial arms, with more than two cross bars on each arm it becomes impossible to properly fit more than one diameter of tire unless some expedient such as one of those shown in FIGURES 7, 10, 11, 12 is utilized.

All such modifications which properly come within the range of the following claims are reserved.

I claim:

1. A tire traction device comprising at least three rigid tire lug hooks for placing in spaced relation around the periphery of the tire, each hook having a substantially radially extending arm, and means comprising a bolt and slot connection between said arms, and ratchet interlock surfaces between said arms for drawing said arms radially inwardly to depress the tire at the tire lug hooks.

2. A tire traction device as defined in claim 1, said arms having notches in the outer of the interlocked arms opposite a portion of the ratchet surface in the other arm for insertion of a pry bar to act as a pawl against said ratchet surface when drawing the arms inwardly while the bolt is loosened in connecting slot.

3. A tire traction device as defined in claim 2, at least two of said arms being of one piece construction at approximately 120° to each other, and having a common ratchet surface coacting with the ratchet surface of a third arm.

4. A tire traction device as defined in claim 2, said arms being pivoted at the center, said bolt and slot connection means being incorporated in one of said arms.

5. A tire traction device as defined in claim 4, and stop means between the two other arms to provide for a minimum angle to which they can be swung toward each other.

6. A tire traction device as defined in claim 2, and additional tire lug hooks having arms pivotally connected to said radial arms.

7. A tire traction device as defined in claim 6, said additional arms extending to both sides of said radial arms and being radially slotted at the pivots to provide adjustment of the hooks to different sizes of tires.

8. A tire traction device as defined in claim 2, and additional arms pivotally connected to said radial arms and extending to both sides thereof to support additional tire lug hooks on the tire.

9. A tire traction device as defined in claim 9, and additional tire lug hooks fixed to the opposite ends of said additional arms, said latter arms being radially slotted at their pivots for limited adjustment.

10. A tire traction device as defined in claim 9; and additional tire lug hooks having peripherally spaced cross bars and pivotally supported at the ends of said additional arms.

11. A tire traction device as defined in claim 3, said third arm being joined to a pair of spaced tire lug hooks around the opposite peripheral portion of the tire.

References Cited in the file of this patent
UNITED STATES PATENTS

| | | |
|---|---|---|
| 2,517,634 | Daley | Aug. 8, 1950 |
| 2,586,049 | Jacobs | Feb. 19, 1952 |